United States Patent [19]
Nilsson

[11] Patent Number: 5,486,269
[45] Date of Patent: Jan. 23, 1996

[54] GASIFICATION OF CARBONACEOUS MATERIAL IN A REACTOR HAVING A GASIFICATION ZONE AND A COMBUSTION ZONE

[75] Inventor: Bengt Nilsson, Skoghall, Sweden

[73] Assignee: Chemrec Aktiebolag, Karlstad, Sweden

[21] Appl. No.: 232,069

[22] Filed: Apr. 28, 1994

[30]     Foreign Application Priority Data

Nov. 4, 1991 [SE]  Sweden ................................ 9103217

[51] Int. Cl.⁶ ................................................ D21C 11/12
[52] U.S. Cl. .......................... 162/31; 162/29; 162/30.1;
          110/238; 48/62 R; 48/107; 48/111; 48/197 R;
                                                                48/212
[58] Field of Search ............................ 162/29, 30.1, 31,
               162/110, 431; 239/9, 8, 416.5, 424, 558;
                  110/238; 431/174; 48/197 R, 209, 212,
                       215, 198.8, 107, 111, 95, 62 R

[56]                  References Cited

U.S. PATENT DOCUMENTS 4,094,625  6/1978  Wang et al. ................................ 431/9
4,692,209  9/1987  Santen et al. ........................... 162/30.1
4,872,950  10/1989  Andersson et al. ........................ 162/15

FOREIGN PATENT DOCUMENTS 0459963  4/1991  European Pat. Off. .
8607396  12/1986  WIPO .

*Primary Examiner*—David L. Lacey
*Assistant Examiner*—Dean T. Nguyen
*Attorney, Agent, or Firm*—Cushman Darby & Cushman

[57]                    ABSTRACT

A method and reactor for thermally decomposing a carbonaceous raw material (6) to recover gas and, if applicable, solid or liquid chemicals, the raw material being fed into a chamber (2) for gasification under under-stoichiometric conditions, the gasification is carried out in a gasification zone (15) at a pressure from atmospheric pressure up to about 150 bar and at a temperature within the range 500°–1600° C. According to the invention a part of the thermal energy required to maintain the endothermic reactions in the gasification zone (15) is produced by combustion of a fuel (8) in a combustion zone (16) located close to and in gaseous contact with the gasification zone, the raw material and fuel being supplied through different nozzle channels (12 and 13, respectively). An oxygen-containing gas (17) is supplied in an amount sufficient to oxidize substantially all the fuel.

16 Claims, 1 Drawing Sheet

GASIFICATION OF CARBONACEOUS MATERIAL IN A REACTOR HAVING A GASIFICATION ZONE AND A COMBUSTION ZONE

FIELD OF THE INVENTION

The present invention relates to a method of thermally decomposing a carbonaceous raw material in order to recover gas for energy and/or the manufacture of chemicals and, if applicable, chemicals in solid and/or liquid form, in which method the raw material is fed into a reaction chamber for gasification of the raw material under controlled under-stoichiometric conditions, and the gasification is carried out in a gasification zone at a pressure from atmospheric pressure up to about 150 bar and at a temperature within the range 500°–1600° C.

BACKGROUND OF THE INVENTION

A great deal of power and heat productions is based on the combustion of both fossil and non-fossil carbonaceous fuels such as coal and oil, and peat and biomass, respectively. The production of power or heat may also be based on the combustion of the gas obtained at gasification of the above-mentioned raw materials. Although gasification constitutes an extra step in the power or heat production chain, it entails considerable advantages that justify this "detour", particularly from the environmental and efficiency aspects. Great efforts are being made to optimize the gasification process to make it still more efficient and therefore more competitive. The conditions for optimization of the gasification process are quite different from those applicable for combustion processes. This is accentuated if the gasification process also includes recovery of inorganic chemicals from the raw material which is difficult to optimize.

In general the gasification of a carbonaceous raw material, i.e. the thermal disintegration when oxygen is supplied under-stoichiometrically, comprises exothermic oxidation reactions and endothermic gasification reactions. Heat is emitted from the exothermic oxidation reactions, which is necessary to produce the endothermic gasification reactions. In principle it can be said that at a stoichiometry of 0.50 half the raw material is combusted exothermically while the other half is gasified endothermically.

In many processes it is desirable to minimize the stoichiometry for other reasons also, i.e. have as low a supply of oxygen as possible, in order to obtain a sufficiently reducing environment, for instance. However, a general problem is then that the energy (heat) produced through the partial combustion is not sufficient to effect the desired degree of gasification, i.e. usually total gasification of uncombusted organic raw material present. This problem can be alleviated by supplying external energy so that a desired proportion of gasification is obtained. There are several methods of supplying external energy without supplying extra oxygen, such as by pre-heating oxygen-containing air supplied or by means of an energy-rich gas heated in a plasma generator. One such method is known through SE-B-448 007 in which external energy is supplied to a gasification reactor by means of a plasma generator. The need of the exothermic oxidation reaction of the black liquor decreases with increasing plasma effect, thus enabling lower stoichiometry, which results in an increased energy content in the gas produced. However, the use of a plasma generator is complicated and expensive. Furthermore, the plasma generator utilizes high quality, expensive electric energy. To a certain extent the same drawbacks exist when using equipment for pre-heating air.

SUMMARY OF THE INVENTION

The object of the present invention is to provide an improved method and improved means which reduce the above-mentioned problems.

The method according to the invention is characterized in that at least a part of the thermal energy required to maintain the endothermic reactions in the gasification zone is produced by combustion of a fuel in a combustion zone located close to and in gaseous contact with the gasification zone, said fuel being supplied to the reaction chamber at at least one point located at a distance from the point for the supply of the raw material, and an oxygen-containing gas is supplied to the reaction chamber in an amount sufficient to oxidize at least substantially all the fuel supplied to the combustion zone. The reactor according to the invention is characterized in that the inlet portion is provided with a burner arrangement for the supply of both the raw material and a fuel through nozzle channels spaced apart from each other so that a combustion zone is formed close to and in gaseous contact with the gasification zone.

Heat to maintain the endothermic reactions in the gasification zone is generated, also suitably in situ, through combustion of a small amount of the raw material supplied, oxygen-containing gas being supplied to the gasification zone in a specific under-stoichiometric amount sufficient to oxidize said small amount of raw material.

According to another preferred embodiment of the method according to the invention a zone of oxygen-containing gas is maintained close to the combustion zone by oxygen-containing gas being supplied to the reaction chamber at at least one point located at a distance from the point for the supply of the fuel. However, it lies within the scope of the invention to supply at least a part of the oxygen for oxidation of the fuel together with the fuel, e.g. as atomization air. The oxygen-containing gas is suitably supplied to the reaction chamber in a total amount corresponding to about 90–110%, preferably 100%, of the stoichiometric quantity required for complete oxidation of the fuel, and about 0–70%, preferably 20–60%, of the stoichiometric quantity which would be required for complete oxidation of the raw material.

The invention offers a very flexible combustion and gasification process which is relatively simple and manageable. Another advantage is that said burner arrangement can be utilized for keeping a reactor chamber warm. A burner arrangement according to the invention also facilitates firing when starting up such a gasification process.

BRIEF DESCRIPTION OF THE DRAWINGS

The invention will be described further in the following with reference to the drawings.

DETAILED DESCRIPTION OF THE INVENTION

Figure 1:
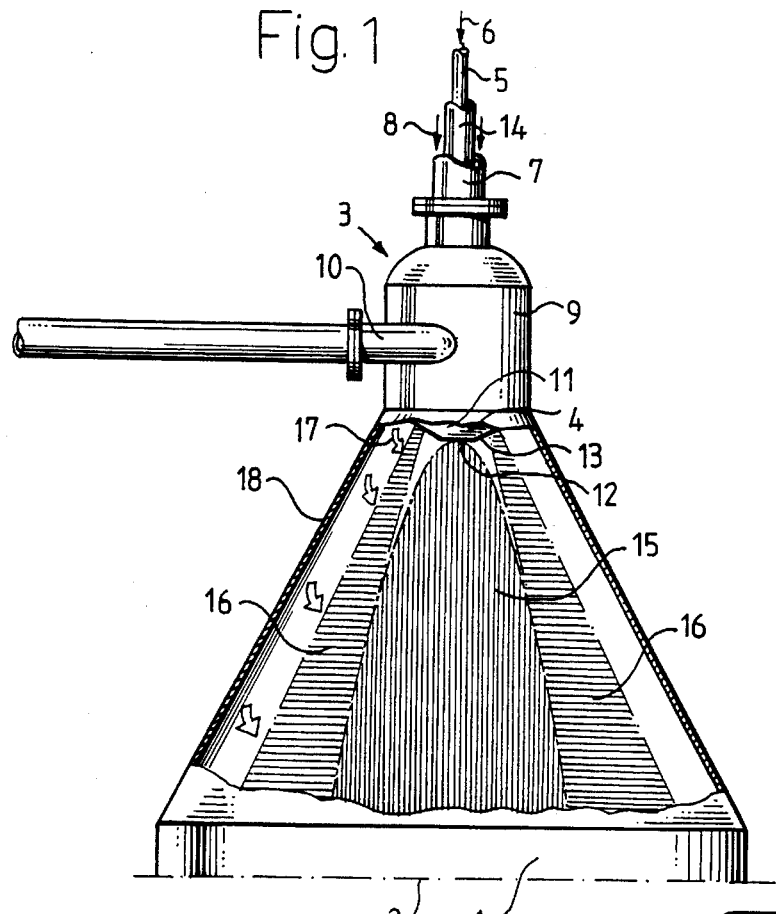
FIG. 1 is a view of the upper part of a reactor, partially in section.

FIG. 1 shows schematically the upper part of a reactor 1 comprising a reaction chamber 2 and inlet portion 3 directed axially with the vertical central axis of the reactor 1. The inlet portion 3 comprises a centrally situated burner device 4, a central first pipe 5 for the supply of raw material 6, a concentric second pipe 7 for the supply of a fuel 8 and a concentric cylinder 9 opening into the reaction chamber 2, radially outside the burner device 4, for the supply of oxygen-containing gas via a pipe 10 connected tangentially to the cylinder 9. The burner device 4, which is thus arranged centrally in the cylinder 9, is provided with a nozzle part 11 to which the first and second pipes 5, 7 are connected to supply the raw material 6 and fuel 8, respectively, via central and peripheral nozzles 12, 13, respectively, located in the reaction chamber 2. A concentric pipe for the supply of atomization agent for at least the raw material 6 is designated 14. This pipe 14 extends axially through the pipe 7 for the fuel 8 and encloses the pipe 5 for the raw material 6. The same, or a similar arrangement of pipes can be used for the supply of atomization agent for the fuel 8.

The raw material 6 is finely divided with the aid of the nozzle part 11 and fed into the reaction chamber 2 to form a central, diverging, reducing gasification zone 15. The fuel 8 is finely divided and sprayed by the nozzle part 11 around said inner gasification zone 15 so that a funnel-shaped oxidizing combustion zone 16 of burning fuel 8 is obtained inside the reaction chamber 2. The oxygen-containing gas 17 is supplied outside the last-mentioned funnel-shaped combustion zone 16 and will follow the conical wall 18 of the reaction chamber 2 downwardly, being gradually supplied to the oxidizing combustion zone 16 surrounding the gasification zone 15. The gasification zone 15 and the combustion zone 16 are in direct gaseous contact with each other. In combination with the cylinder 9 and the burner device enclosed therein, the tangential pipe 10 produces a vortex effect on the oxygen-containing gas which is favourable since it enables the flow and distribution of the gas 17 to be at least partially controlled so that the optimization of the combustion and gasification processes is facilitated.

Thanks to the oxygen-containing gas 17 being supplied peripherally, the fuel 8 is able to be oxidized under stoichiometric or even over-stoichiometric conditions in the funnel-shaped or conical combustion zone 16 within which the substantial combustion of the fuel 8 is occuring. This combustion zone 16 will therefore form an oxygen shield against the inner gasification zone 15 so that the latter becomes reducing in a desirable manner. The combustion zone 16 thus restricts penetration of the oxygen to the inner gasification zone 15, which is necessary in order to obtain the desired reducing environment for gasification of a carbonaceous raw material 6. Furthermore, the combustion in the combustion zone 16 results in the emission of heat to the gasification zone 15 to maintain the endothermal reactions therein (in the extreme case down to pure pyrolysis). With the aid of the invention, therefore, the two materials 6, 8 can be process-optimized under individual stoichiometry. The fuel 8, for instance, may be combusted with an individual stoichiometry of 1.1, while at the same time the raw material 6 undergoes partial gasification with an individual stoichiometry of 0.3, a corresponding amount of raw material 6 thus being combusted in the gasification zone 15 per se.

The invention will be described in the following in connection with combustion of a spent liquor obtained as a waste product from the production of paper pulp. However, the scope of the invention is not limited by this example. A waste product known as black liquor is obtained after the digestion process in the production of sulphate pulp, for instance. The black liquor is gasified in a first step in order to recover chemicals therein, after which energy-rich gas formed during gasification is combusted in a second step in order to recover the energy content of the black liquor. The gasification process must take place under extremely reducing conditions (stoichiometry under 1) both so that after gasification of the organic material, the inorganic substance (chemicals) will have such a composition—sulphur in sulphide form—that it can be re-used for the preparation of fresh digestion chemicals, and also so that the gas produced will have a sufficiently high energy content to be used as fuel in a steam boiler or gas turbine, for instance.

In a preferred embodiment the carbonaceous raw material 6 consists of black liquor having a dry solids content of about 65–75%, the oxygen-containing gas 17 of air preheated to a temperature of at least 500° C. and the fuel 8 of thick oil. Thanks to its catalytic effect, the content of alkali metals in the black liquor 6 then has a favourable effect on the combustion process of the thick oil.

The fuel 8 may be selected such that its reactivity $R_2$ is lower than the reactivity $R_1$ of the raw material 6. In the preferred case the reactivity $R_2$ of the fuel 8 is at least 5% lower, preferably at least 20% lower, than the reactivity $R_1$ of the raw material 6. The reactivity of a spent liquor 6 is partly dependent on its dry content ($d_s$), the reactivity increasing with increasing dry content.

If a raw material 6 is used in the form of a black liquor containing inorganic constituents (i.e. constituents which are not combusted or do not form combustible gases), these constituents may be separated optionally either directly from the gas flow in the reactor 1 (in a "quench") or in some other way after the reactor (e.g. in a cyclone).

Figure 2:
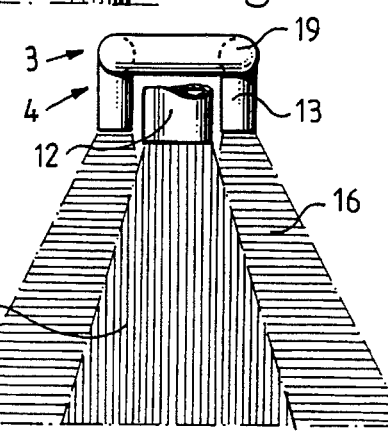
FIG. 2 is a view of an arrangement of burner nozzles according to the invention.

In the embodiment shown in FIG. 1 the inlet portion 3 comprises an integrated burner device 4 with the aid of which both the gasification zone 15 and the combustion zone 16 are produced inside the chamber 2. In the embodiment shown in FIG. 2 the inlet portion 3 comprises a burner device 4 consisting of two separate units, viz. an inner unit with a centrally located burner nozzle 12 for the raw material 6, and an outer unit with an annular arrangement of burner nozzles 13 for the fuel 8. The burner nozzles 13 for the fuel 8 comprise an annular distribution device 19 connected to a plurality of burner nozzles 13. In an arrangement of burner nozzles 12, 13 of this type, formed of separate units, the various parts are preferably adjustable in relation to each other so that easy optimization of the gasification process subsequently can be achieved by optional adjustment of the various parts.

Figure 3:
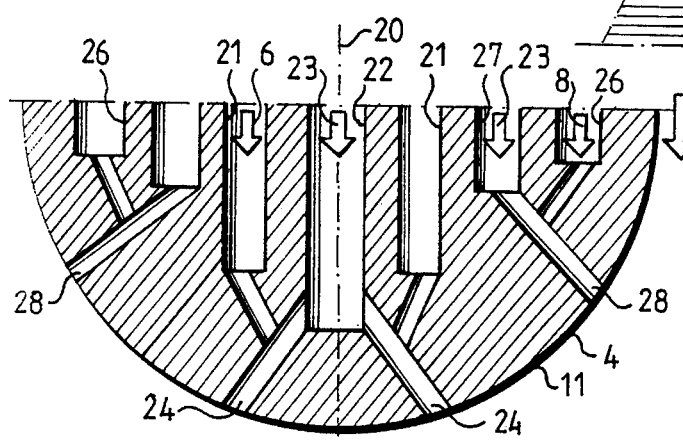
FIG. 3 is a sectional view of a nozzle part of a burner device according to the invention.

FIG. 3 shows a part of an integrated burner device 4 in section in order to illustrate the principle more clearly. The nozzle part 11 of the burner device 4 is provided with supply channels 21 for the raw material 6, arranged symmetrically around the central axis 20. A certain quantity of atomizing air 23 is supplied via a centrally arranged channel 22, in order to obtain optimal spreading and distribution of the raw material 6 as it leaves the nozzle channels 24. The fuel 8 is supplied through a number of channels 26 arranged outside the channels 21 for the supply of raw material 6. The fuel 8 is also spread and distributed with the aid of atomizing air 23 supplied via channels 27 arranged between the supply channels 21, 26 for raw material 6 and fuel 8, respectively. Nozzle channels 28 for the fuel 8 are situated above and radially outside the nozzle channels 24 for the raw material 6. The outlet direction of each nozzle channel 24, 28 diverges in relation to the central line 20. In the case shown the outlet direction of each nozzle channel 24 for raw material 6 is directed so that an acute angle of about 30° is formed with the central line 20, the angle between the outlet direction for each nozzle 28 for the fuel 8 and the central line 20 being about 45°. The divergence of the funnel-shaped combustion zone 16 formed by the finely divided fuel 8 is partially counteracted by the supply of oxygen-containing gas 17 since this gas 17 is supplied in a main direction substantially coinciding with the central line 20 of the burner device 4. (If an vortex-generator is used the gas 17 will also be caused to rotate about the central line 20 as shown in FIG. 1.)

Alternatively, a part of the fuel gas produced may constitute at least a part of the fuel 8, in which case fuel oil is suitably used as fuel during the start-up phase. Once the reactor is started up some of the fuel gas recovered from the reactor is circulated. This design thus allows a free choice between supplying fuel in the form of fuel gas recovered from the reactor itself and/or from an external fuel source.

The invention is not limited to the above embodiments but may be varied within the scope of the appended claims. It is thus obvious to one skilled in the art that fuels other than those mentioned above, such as fuel oil, natural gas, alcohols, etc. may be used. Even residual oil in the form of petroleum coke from oil refineries may be used. This residual oil constitutes a waste product and it is difficult to find a use for it since its sulphur content is high, often about 3–6%. The addition of sulphur to gasification reactors of the type described may contribute certain advantages with respect to recovery of inorganic substances present thanks to higher $H_2S$ partial pressure in the reaction vessel, and residual oil may therefore consitute an extremely advantageous fuel. It is also advantageous from the environmental aspect since the sulphur as such can be recovered in the present process in a relatively simple manner, as well as it being possible to influence the sulphidity of the liquor stock, and thus also the digestion process.

Normally water is added to fuel oils of the thick oil type in order to obtain better combustion with less soot. Synergistic effects can thus be obtained by coordinating black-liquor gasification and oil combustion (fuel) in accordance with the invention, thanks to the water content of the black liquor. The raw material can of course be varied as well and may constitute digested sludge from sewage-treatment plants, for instance, which, as opposed to black liquor for instance, has lower reactivity than oil. Besides supplying the raw material centrally and the fuel radially outside said supply of raw material, a second fuel such as a mixture of gas and liquid fuels, etc. may also be supplied radially outside the first-mentioned supply of fuel.

It is also evident that the angle between fuel supply and supply of raw material shown in the example may be varied within wide limits. Similarly it is evident that some other type of burner nozzle with annular orifice can be used instead of a plurality of drilled nozzle channels to the supply of raw material and fuel.

Furthermore, the atomizing air may be replaced with another gas, e.g. steam.

The atomizing medium may even be omitted all together and replaced with pressure atomization.

The raw material fed into the gasification zone may consist of a mixture of two or more components from different sources. According to a specific embodiment the raw material consists of black liquor and a carbonaceous component of different origin, e.g. petroleum coke which, as mentioned above, is a waste product having a sulphur content of 3–6%. The black liquour and petroleum coke can be mixed either before being fed into the burner device or in the nozzle part per se in which they are fed in through different channels which run together into a common nozzle channel so that the two materials are mixed therein before being fed into the gasification zone. Symbiosis is thus obtained between black liquor and petroleum coke, viz. (a) alkali metals in the black liquor catalyse the gasification of the petroleum coke; (b) the water content of the black liquor improves atomization of the petroleum coke thereby improving gasification/combustion of this component while producing smaller amounts of residual carbon and soot (water is otherwise normally added when gasifying such heavy oil products); (c) the sulphur content in the petroleum coke increases the partial pressure of the $H_2S$ gas so that the reaction is displaced to the right in the equilibrium reaction, thereby suppressing the formation of $Na_2CO_3$ which is important in pressurized reactors, for instance: $Na_2CO_3 + H_2S \leftrightarrows Na_2S + CO_2 + H_2O$; (d) the sulphur content in the petroleum coke increases the sulpidity of the liquor stock, thereby enabling altered digestion conditions particularly in the initial stage of the digestion process.

I claim:

1. A method of thermally decomposing a carbonaceous raw material to recover gas for energy or manufacture of chemicals in solid or liquid form, which comprises:

(a) feeding the raw material into a reaction chambers, (b) gasifying the raw material under controlled under-stoichiometric conditions, wherein the gasification is carried out in an inner gasification zone at a pressure from atmospheric pressure up to about 150 bar and at a temperature within the range 500°–1600° C., (c) combusting a fuel which is supplied to the reaction chamber at a point located at a distance from the point of feeding the raw material to provide at least a part of the thermal energy required to maintain the endothermic reactions in the gasification zone wherein the combustion of the fuel is carried out in a combustion zone in gaseous contact with the inner gasification zone to surround the inner gasification zone (d) maintaining a zone of oxygen-containing gas close to and outside of the combustion zone by supplying oxygen-containing gas to the reaction chamber at one point located at a distance from the point for supplying of the fuel and in an amount sufficient to oxidize at least substantially all the fuel supplied to the combustion zone.

2. A method as claimed in claim 1, wherein the heat to maintain the endothermic reactions in the gasification zone is also generated in situ through combustion of a small amount of the raw material supplied, the oxygen-containing gas being supplied to the gasification zone in a specific under-stoichiometric amount sufficient to oxidize said small amount of raw material.

3. A method as claimed in claim 1 or 2, wherein spent liquor from the manufacture of paper pulp is added as said carbonaceous raw material.

4. A method as claimed in claim 3, wherein the spent liquor comprises waste products from the manufacture of sulphate pulp, containing sodium and sulphur.

5. A method as claimed in claim 1, wherein the oxygen-containing gas is supplied to the reaction chamber in a total amount corresponding to 90–110%, of the stoichiometric quantity required for complete oxidation of the fuel, and about 20–70%, of the stoichiometric quantity required for complete oxidation of the raw material.

6. A method as claimed in claim 1, wherein the raw material has higher reactivity than the fuel.

7. The method as claimed in claim 6 wherein the raw material comprises black liquor and the fuel is one of thick oil and petroleum coke having a sulphur content exceeding 2%.

8. The method as claimed in claim 7 wherein the fuel includes gas recovered from the reaction chamber.

9. A method as claimed in claim 1, wherein at least 50% of the oxygen supplied to the reaction chamber is added by the oxygen-containing gas for the combustion zone.

10. A method as claimed in claim 1, wherein the raw material comprises components from different sources including black liquor and a carbonaceous component of different origin and having a relatively high sulphur content.

11. The method as claimed in claim 1 wherein at least 80% of the oxygen supplied to the reaction chamber is added by the oxygen-containing gas for the combustion zone.

12. The method as claimed 1 wherein the oxygen-containing gas is supplied to the reaction chamber in a total amount corresponding to 100% of the stoichiometric quantity required for complete oxidation of the fuel and about 20-60% of the stoichiometric quantity required for complete oxidation of the raw material.

13. A reactor for thermally decomposing a carbonaceous raw material to recover gas for energy, manufacture of chemicals and chemicals in solid or liquid form, comprising a reaction chamber having an inner gasification zone for gasification of raw material under controlled under-stoichiometric conditions, means for maintaining a pressure in the inner gasification zone from atmospheric pressure up to about 150 bar and a temperature of 500°–1600° C. said reaction chamber having an inlet portion for the supply of raw material, said inlet portion having a burner device, said burner device having separate nozzle channels spaced apart from each other for supplying both raw material and a fuel so as to define a combustion zone surrounding and in gaseous contact with the inner gasification zone.

14. A reactor as claimed in claim 13, said reactor containing an inlet means opening into the reaction chamber, to supply the oxygen-containing gas, said inlet means being arranged at a distance from the nozzle-channels for the supply of the raw material and fuel.

15. A reactor as claimed in claim 14, wherein said inlet means is arranged concentrically in relation to the burner device.

16. A reactor as claimed in claim 12, wherein said burner device comprises a nozzle part with inner, centrally situated nozzle channels for the raw material and nozzle channels arranged peripherally in relation to said inner, centrally situated nozzle channels, for the supply of fuel, and that the nozzle part is enclosed in said inlet means in the form of a cylinder to form an annual gap therebetween for the supply of oxygen-containing gas to a zone situated close to the combustion zone.

* * * * *